Figure 1:
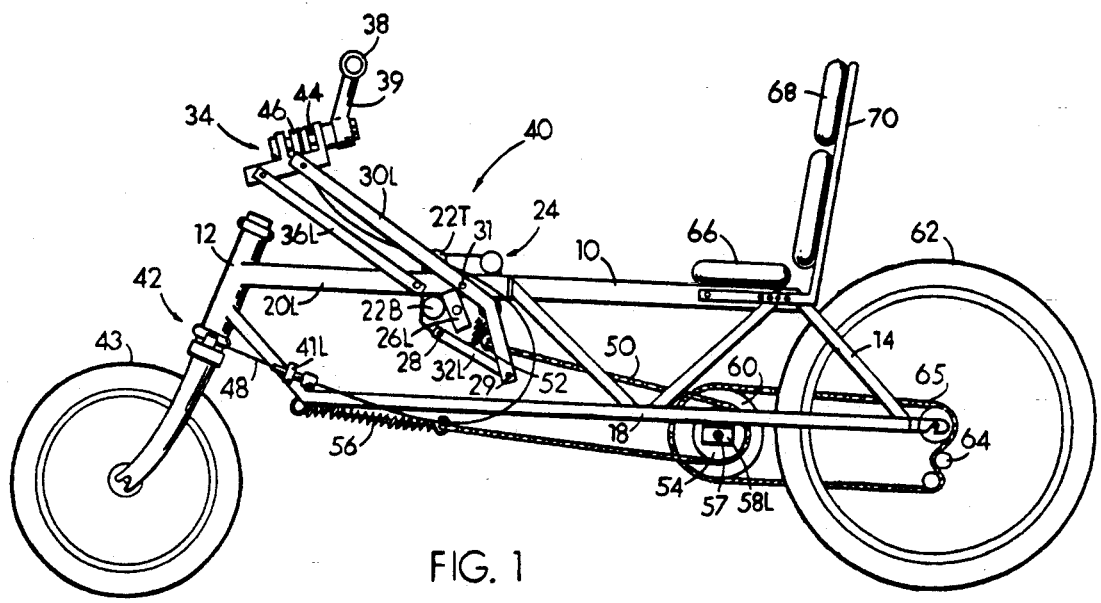

United States Patent [19]

Schmidlin

[11] Patent Number: 5,280,936
[45] Date of Patent: Jan. 25, 1994

[54] HUMAN POWERED VEHICLE AND DRIVE SYSTEM

[76] Inventor: Dennis Schmidlin, 1002 W. College Ave., Woodville, Ohio 43469

[21] Appl. No.: 56,471

[22] Filed: May 3, 1993

[51] Int. Cl.⁵ .............................................. B62M 1/12
[52] U.S. Cl. .................................. 280/234; 280/244; 280/252
[58] Field of Search ............... 280/230, 233, 234, 240, 280/242.1, 244, 246, 252, 253, 255, 258, 263, 288.1

[56] References Cited

U.S. PATENT DOCUMENTS

| | | | |
|---|---|---|---|
| 3,760,905 | 9/1973 | Dower | 280/233 X |
| 3,895,825 | 7/1975 | Sink | 280/234 |
| 4,305,600 | 12/1981 | Mendez | 280/226 R |
| 4,508,358 | 4/1985 | Erel | 280/234 |
| 4,632,414 | 12/1986 | Ellefson | 280/246 |
| 4,639,007 | 1/1987 | Lawrence | 280/234 |
| 4,700,962 | 10/1987 | Salmon | 280/220 |
| 4,796,907 | 1/1989 | Geller | 280/220 |
| 4,928,986 | 5/1990 | Carpenter | 280/234 |

FOREIGN PATENT DOCUMENTS 2455540 1/1981 France ............................ 280/240

*Primary Examiner*—Margaret A. Focarino
*Assistant Examiner*—Vitor E. Johnson

[57] ABSTRACT

A two wheeled human powered vehicle, having a frame with seating arrangement resembling a long wheelbase recumbent bicycle. The drive mechanism includes two parallel operating lever arms supporting a steering assembly on their upper end, fulcramed in the middle, and operably connected at their lower end to a linearly reciprocable footrest assembly. The operator forces the footrests forward directly with the legs while assisting with the arms by drawing the handlebar, thereby providing a rowing motion that utilizes arm and leg power independently. Linear motion is converted to rotational motion and power is transferred to the drive wheel via a jackshaft, including an overrunning clutch, along with a sprocket and an endless chain, operably connected to the drive wheel. Steering is accomplished through flexible sleeved cables, controllably connecting the handlebar to the front steering fork.

17 Claims, 3 Drawing Sheets

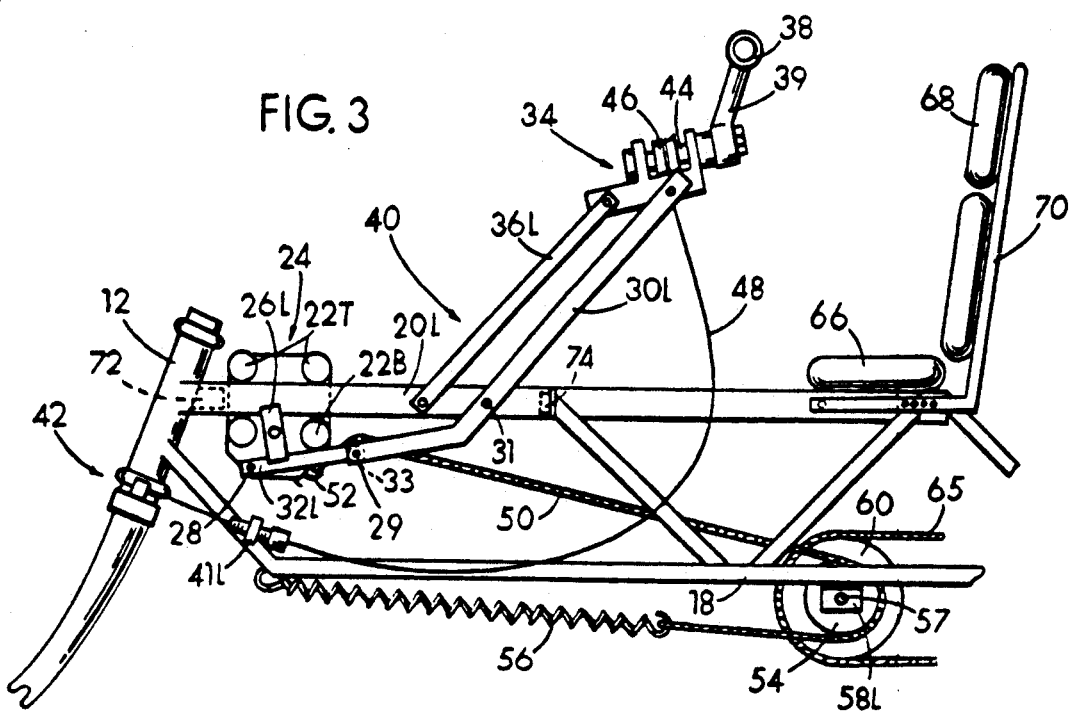
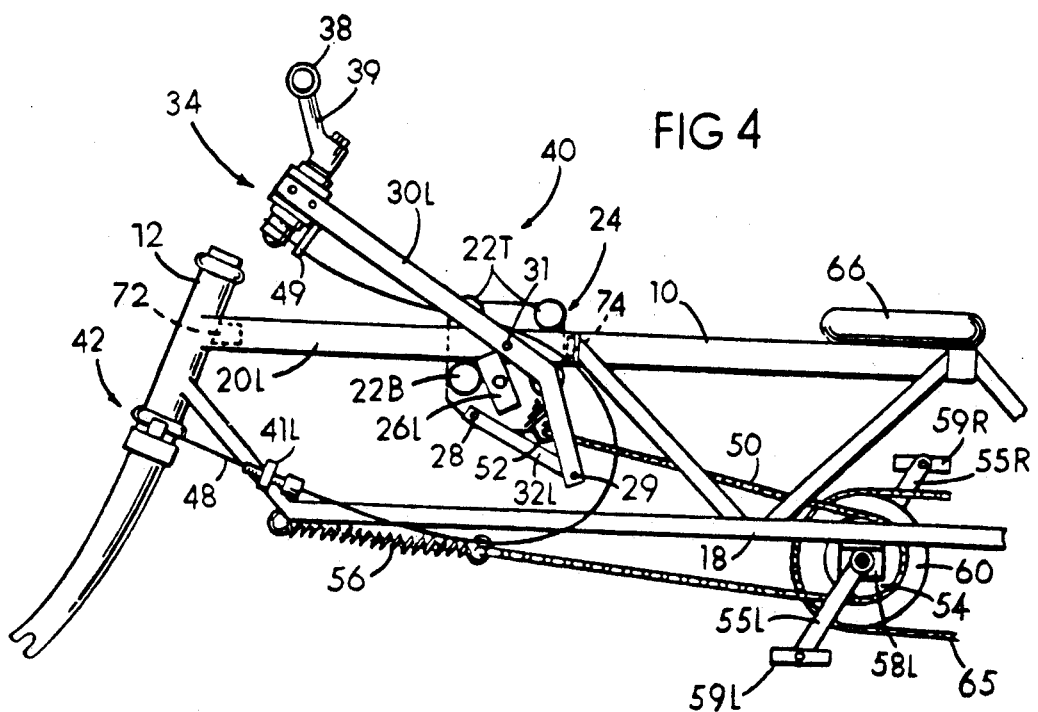

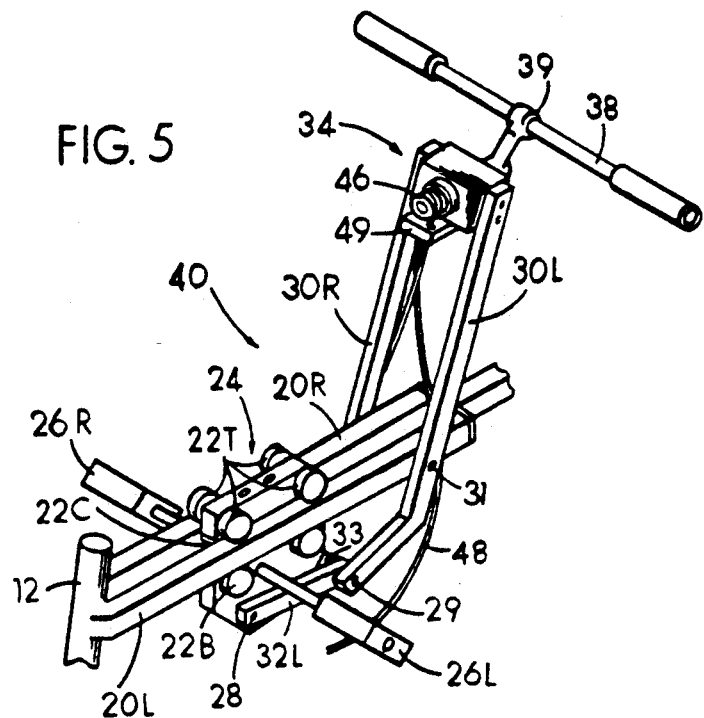
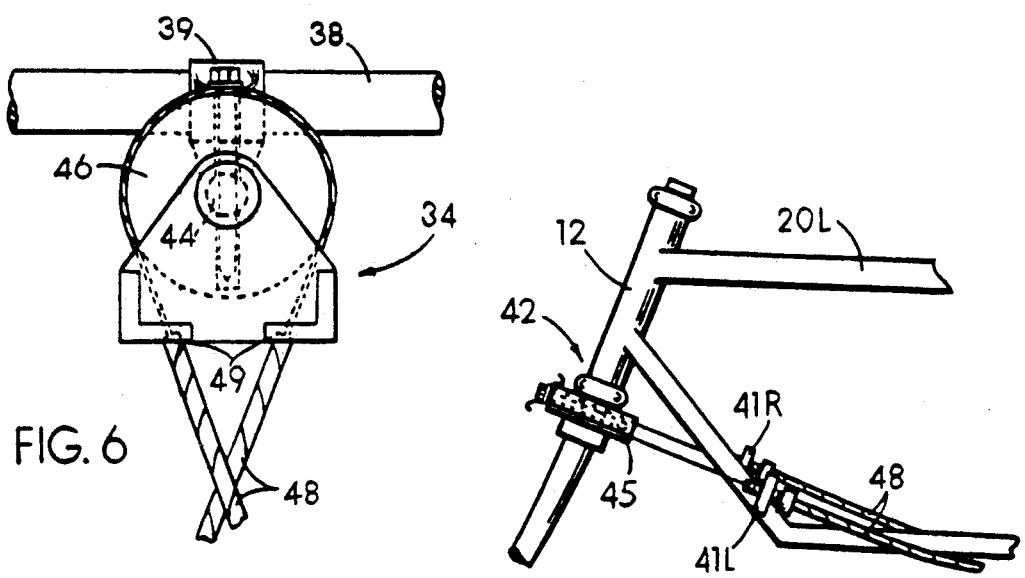

HUMAN POWERED VEHICLE AND DRIVE SYSTEM

BACKGROUND—DISCUSSION OF PRIOR ART

Many variations of human powered vehicles attempt to independently combine arm and leg power. This is an advantage for transportation purposes and also produces better overall exercise than is possible with pedal-crank bicycles. The rowing motion is the most natural form for coordinating arm and leg power, but has never been successfuly incorporated into a genuinely practical land vehicle.

U.S. Pat. No. 4,632,414 discloses a three-wheeled land vehicle that does a good job of simulating rowing. The same may be said for the vehicles disclosed in U.S. Pat. Nos. 4,700,962 and 4,796,907. The vehicle of U.S. Pat. No. 4,305,600 uses rowing motion on a simpler two-wheeled vehicle. Unfortunately, for all of these vehicles, the arm and leg forces are not truly additive. All of the power delivered to the drive wheel must be transferred through the arms, which fatigue quickly.

U.S. Pat. Nos. 4,928,986 and 4,508,358 disclose vehicles that are two wheelers in at least one embodiment and use arm and leg power independently. Unfortunately, they are encumbered by heavy, inefficient mechanisms resulting from essentially separate drive systems for the arms and legs.

All vehicles that have attempted to combine arm and leg power have proved too awkward in handling, and too inefficient due to weight and complexity or poor conservation of kinetic energy. Most are also hindered by poor impedance matching between the operator and machine through less than optimum leverage, stroke amplitude, or gearing.

It is well known that rowing is one of the best motions for exercising all the major muscle groups. It is less well known that this motion can produce more horsepower than that of turning a pedal crank; thereby, making the human body a more powerful engine for driving a vehicle. What has never before been created is a vehicle that can utilize this motion in a light weight, energy efficient system, while at the same time providing a comfortable body position and easy handling for an overall superior Human Powered Vehicle.

OBJECTS AND ADVANTAGES

Accordingly, several objects and advantages of my invention are:

a) To provide a Human Powered Vehicle which simulates the linear reciprocating motion of rowing, or sculling, with a sliding seat.

b) To provide a drive mechanism that improves upon standard rowing by permitting the legs to drive the "oars" directly. This results in a type of "forced rowing" that uses arm and leg power independently.

c) To provide a human powered vehicle that exercises every major muscle group to a high degree of efficiency, through proper impedance matching and a motion which feels ergonomically correct.

d) To provide a vehicle that is comfortable, allowing a panoramic view and easy handling characteristics.

e) To provide a narrow vehicle that is relatively safe in traffic.

f) To provide a vehicle with a medium length wheelbase, and a medium low center of gravity which offers a smooth ride and stability, in addition to good aerodynamics and ease in mounting or dismounting.

Further objects and advantages are to provide a vehicle that is highly adaptable to different drive train modifications, the simplest of which being a pedal crank for use in hill climbing, to provide a vehicle which is adaptable to performance enhancers, such as spring biasing, a vehicle which is simple to use, inexpensive to manufacture, and uses standard bicycle components and aftermarket products.

Still further objects and advantages will be apparent after a consideration of the ensuing description and drawings.

SUMMARY OF INVENTION

In accordance with the invention there is provided a two-wheeled human powered vehicle with an improved drive system, simulating a rowing motion, while allowing the legs to drive the vehicle directly. On the upper end of a levering assemblage, a handlebar, which is in steerable communication with the front wheel through flexible sleeved cables, serves as the oar handles for the rowing device. Reciprocation of the handlebar imparts a linear reciprocation of the footrest assembly in the opposite direction. The leg and arm motions are coordinated in the optimum rowing form, with the accumulated force conveyed to the drive wheel via an overrunning clutch operatively connected to the drive wheel to effect a forward rotation thereof.

DRAWING FIGURES

In the drawings, closely related figures have the same number but different alphabetic suffixes. Figures that are identical but located on opposite sides of the vehicle are designated with an L suffix for left side and an R suffix for right side.

FIG. 1. Full length side view of preferred human powered vehicle embodiment.

Figure 2:
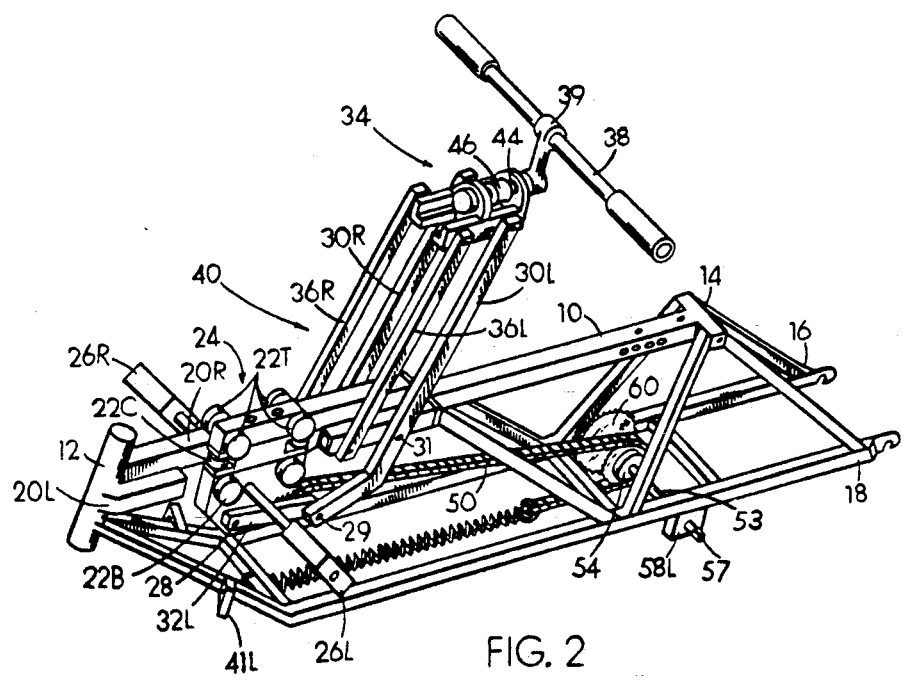

FIG. 2. Isometric view detailing steering assembly, footrest assembly, drive mechanism, primary drive train, and frame.

FIG. 3. Side view shows rear most position of steering assembly.

FIG. 4. Side view shows simpler embodiment of main drive mechanism, pedal-crank embodiment, and seat embodiment.

FIG. 5. Isometric view of simplified drive mechanism.

FIG. 6. End view of steering assembly, illustrating steering cable stops and large diameter drum with mounting technique.

FIG. 7. Side view shows a second embodiment of the fork assembly with steering method.

DESCRIPTION OF INVENTION

A typical embodiment of the human powered vehicle of the present invention is illustrated in FIG. 1 and FIG. 2. Referring to these two figures; The vehicle includes a frame 10 comprising a front end 12 and a rear end 14, a right side 16, (not shown in left side views), and a left side 18. Frame 10 is symmetrical from left to right along its longitudinal axis and resembles that of a long wheelbase, two wheeled recumbent bicycle, which is known to the art. Frame construction may be of any suitable frame material but preferably of welded square cross-sectional steel tubing and of an "A" framed, double truss design as shown, providing a high degree of rigidity to the frame structure.

The top of frame 10 embodies a left and right footrest assembly guide member (designated 20L and 20R). Guide members 20 L&R support the main drive mechanism 40 and are essential to the function of the linear motion element of drive mechanism 40.

Guide members 20 L&R consist of a suitable material to guide footrest assembly guide rollers 22T, 22B, and 22C, and serve as structural support members as well. The preferred embodiment utilizes square cross-sectional stainless steel tubing in a parallel side-by-side configuration and is of welded construction to form an integral part of the frame.

FIG. 2 shows a left guide member 20L partially cut away to detail a footrest assembly 24, comprised of three solid pieces of aluminum or other lightweight material such as plastic, of which the center piece contains center guide rollers 22C. Footrest assembly 24 is removeably joined together by bolting, to facilitate the removal of footrest assembly 24 from guide members 20 L&R, and allow the disassembly of center rollers 22C from footrest assembly 24; center rollers 22C being held in place by axles, which are constrained by the top and bottom portions of footrest assembly 24. Four top rollers 22T and four bottom rollers 22B are journaled from footrest assembly 24 and all rollers are of a suitable plastic material or steel ball bearing to permit footrest assembly 24 to guidedly roll in a linear reciprocating movement between guide members 20 L&R.

Included on footrest assembly 24 are pivotally attached pedals, or footrests 26L and 26R for placement of the rider's feet and receiving force from the rider's legs.

Located below footrests 26 L&R on footrest assembly 24 are rigid linkage members 32L and 32R, (32R not shown) pivotally attached at pivot 28, which transmit force from the rider's arms to footrest assembly 24 via lever arms 30L and 30R. Linkage members 32L&R are identical, and journaled from opposite sides of footrest assembly 24 on the same axis; thus, operate together as one unit.

Similarly, lever arms 30L&R, along with upper linkage members 36L and 36R, are also identical. Lever arms 30L&R are bent forward at a predetermined angle below their fulcrum pivot 31 for clearance of other vehicle parts, as well as to enhance mechanical advantage characteristics throughout the motion range of the device. Lever arms 30L&R function as a single levering means, pivotally linked with and journaled on the same shaft 29 as linkage members 32 L&R. Best shown in FIGS. 2 and 3, shaft 29 extends across the width of drive mechanism 40 and contains a roller 33 in the center. Roller 33 rotates on the axis of shaft 29 and is made of a plastic or suitable material. Roller 33 acts as a spacer to keep linkage members 32 L&R located properly on shaft 29 and also reduces friction when shaft 29 contacts drive chain 50 at the end of the drive stroke.

Lever arms 30 L&R are constructed of similar materials as frame 20 and pivotally support a steering assembly 34 in conjunction with upper linkage members 36 L&R. Members 36 L&R may be of lighter materials than lever arms 30 L&R. The pivots on steering assembly 34 are two sets of journals, projecting coaxially from opposite sides of steering assembly 34 as are the pivots on left and right guide members 20 L&R. Guide members 20 L&R, together with the upper portions of lever arms 30 L&R and linkage members 36 L&R, form essentially an articulated parallelogram of identical symmetry on each side of drive mechanism 40. Steering assembly 34 forms the upper side of each parallelogram as shown in FIG. 2. This double parallelogram configuration maintains support of steering assembly 34 at a more operable attitude with respect to the rider throughout the stroke of drive mechanism 40. While not vital to the operation of the vehicle, this configuration increases comfort and enhances steering control for the rider.

FIGS. 4 and 5 illustrate an embodiment of drive mechanism 40 which does not include upper linkage members 36 L&R, or a "floating" steering assembly. Another embodiment may utilize a cantilever steering and footrest assembly, supported by a monolevering assembly and be within the spirit and scope of this invention.

The vehicle utilizes a standard bicycle handlebar 38 and a standard bicycle front fork assembly 42, as shown in FIG. 1. This permits the use of standard bicycle brake systems (not shown) and standard handlebar mounted gear shifters, also not detailed as these components are well known to the art.

Handlebar 38 is attached to a steering column or shaft 44 via a standard bicycle stem 39, modified to enable fixedly mounting to shaft 44. Shaft 44 is rotatably mounted in steering assembly 34, which is preferably composed of lightweight materials, such as aluminum of welded construction, and may utilize flanged bushings of a suitable bearing material, or ball bearings for shaft rotation. Also fixedly mounted on shaft 44 is a drum 46, which may take the form of a disk. Operably connecting steering assembly 34 to front fork assembly 42 are flexible, sleeved cables 48, such as those used for motorcycle clutch or brake control. Cables 48 are wrapped over drum 46 and affixed to it. Cable sleeve stops 49 are part of steering assembly 34 as detailed in FIG. 6. Cables 48 cross each other under steering assembly 34 with their other ends being affixed at opposite sides of fork assembly 42, in such a manner that cable routing will not interfere with the motion of drive mechanism 40. Adjustable cable sleeve stops, 41L and 41R on frame 10, maintain tension on cables 48, thereby enabling steering assembly 34 to impart rotation to fork assembly 42, in the same direction as handlebar 38 is turned.

FIGS. 6 and 7 detail how a more rigid steering control is accomplished using a larger diameter drum 46 on steering assembly 34 and a large diameter drum 45 on fork assembly 42, allowing more leverage of cables 48 on fork assembly 42.

FIG. 1 shows a drive chain 50, removably connected to footrest assembly 24 by a hooking device 52, being affixed through a hole in footrest assembly 24. Drive chain 50 is traversed over an over-running clutch 54 and extends forward to be extensively affixed to the front of frame 10 via retracting spring 56. Overrunning clutch 54 is fixedly mounted to a jack shaft 53 which is journaled from frame 10 on bearing blocks 58L and 58R. (Right bearing block is not shown.) Jack shaft 53 also contains thereon a sprocket 60 which could be substituted by a standard chainring cluster and transmission as would be used on the pedal crank of a standard bicycle. As illustrated in FIG. 1, sprocket 60 is fixedly located on jack shaft 53 to be in the same orientation with rear wheel 62 and transmission 64 as the orientation of sprockets and wheels on standard bicycles. Rear wheel 62 and transmission 64 are mounted to frame 10, and sprocket 60 is driveably linked with rear transmission 64 using endless chain 65, in the same manner as utilized on standard bicycles. This provides the same gearing options to the vehicle of the present invention, as is possible with standard bicycle components, known to anyone in the field.

As shown in FIG. 2, the ends 57 of jackshaft 53 may extend through bearing blocks 58 and be formed to accept standard bicycle pedal crank arms, affixed by bolting in the standard way of better bicycles. FIG. 4 illustrates an embodiment of the vehicle with crank arms 55 L&R, and pedals 59 L&R attached, establishing essentially a standard bicycle foot pedal crank and drive train conjoined with the drive train of drive mechanism 40. In this embodiment, the rider can stand to crank pedals, Bit and row? or coast, as desired.

Also detailed in FIG. 4 is a simpler embodiment of drive mechanism 40, as previously described, and an embodiment of seat 66 with no back rest. It should be noted that these embodiments may be incorporated together as a high performance version of the vehicle, separately, or in any combination.

In the preferred embodiment of the vehicle, as illustrated in FIG. 1 seat 66 and backrest 68 are separately mounted to facilitate individual adjustment of each, or the complete removal of backrest 68 while retaining seat 66. Bolting seat 66 from underneath and bolting backrest 68 from the sides accomplishes this. Backrest support member 70 can be made of square cross-sectional steel tubing, while seat and backrest cushions are upholstered board of suitable materials. A standard recumbent bicycle seat well known to the art could be substituted here.

FIG. 3 illustrates with phantom lines a front footrest assembly stop 72, and a rear stop 74. These stops are located between guide members 20 L&R. Their purpose is to limit the travel of footrest assembly 24 in either direction and cushion the stop. They are made of suitable material such as rubber and are held in place by fitting tightly between guide members 20 L&R, and by an adhesive.

From the description above, a number of advantages of my human powered vehicle become evident:

a) The vehicle has similar frame geometry as that of a long wheelbase, two wheeled recumbent bicycle; a proven design for superior comfort, safety, and handling characteristics, as well as very good aerodynamics.

b) The vehicle uses mostly standard bicycle or recumbent bicycle components, available at many parts outlets.

c) The vehicle is adaptable to many standard aftermarket products such as lights, horns, storage racks, panniers, car racks, and stationary exercise converting mechanisms.

d) The vehicle is highly adaptable to different gearing and drive train modifications.

e) The main drive mechanism is extremely compact, lightweight, and efficient due to its small number of moving parts.

f) The vehicle is easy and economical to manufacture.

OPERATION OF PREFERRED EMBODIMENT

FIG. 1 illustrates the vehicle at rest with steering assembly 34 in its most forward position. This offers comfortable, easy mounting by a rider. At this time the vehicle is shifted to a low gear for easy starting. In this embodiment, there are no crank arms 55 L&R attached; therefore, the rider would sit on seat 66, grasp handle bar 38 with both hands, and place either left or right foot on its corresponding footrest 26L or 26R. Rider then pulls back on handlebar 38 while bracing one foot on its footrest and "shoving off" from the ground with the other foot. Steering the vehicle is done simultaneously with drawing the handlebar or "rowing". The rider places the other foot on its footrest while maintaining balance of the vehicle in a manner similar to the way starting is accomplished on a two wheeled recumbent bicycle with top steering. Stability is quickly achieved and the rider may begin up-shifting and accelerating with full rowing strokes.

The form and motion are essentially that of sculling with a sliding seat, but they are derived in a different manner. Rather than the fixed footrests and sliding seat of a scull, seat 66 and backrest 68 are rigidly mounted to frame 10 while footrests 26 L&R slide (or roll) to obtain the leg motion. The legs brace while the arms row, but with my drive system, this can be done in reverse, with the legs driving the "oars" directly. This allows the arms to do very little work if desired, aside from steering the vehicle. The "oars" in this case being handlebar 38 which is operably connected to drive mechanism 40, and steerably connected to the front fork via flexible sleeved cables 48.

It is natural for a rower to pull with the arms only while pushing with the legs. Only the force applied should be independent and infinitely variable for each, to provide rest for the arms while still powering the vehicle with the legs.

Arm and leg power also complement each other through the way the forces are vectored. The non-linear angle of force applied by linkage members 32 L&R to footrest assembly 24 opposes the non-linear angle of force applied by the legs. Force vectors are focused in a linear direction, parallel to the longitudinal axis of guide members 20 L&R. This results in very low frictional losses in the linear motion of footrest assembly 24. Along with the doubling of the drive mechanism symmetrically on each side of the vehicle, the system yields very little energy loss from frame flex, low frictional losses from side loading, and a smooth overall action.

My vehicle addresses conservation of energy in a number of ways. FIGS. 1 and 3 show the forward most and rear most positions of handlebar 38. From the forwardmost position, the riders arms have a high mechanical advantage enabling rapid acceleration of the mechanism and a smooth, early link-up with the drive train. As the power stroke progresses, mechanical advantage of the arms decreases to approximately the center of the stroke where the rider's strength is greatest. Mechanical advantage then begins to increase again as the angle between linkage members 32 L&R and lever arms 30 L&R straightens. From approximately the middle of the power stroke, the velocity of the rider's arms begins to increase. Approaching the end of the power stroke, the upper part of drive mechanism 40 and the rider's arms are moving relatively fast, producing more kinetic energy. This is precisely the time roller 33 on pivot shaft 29 contacts drive chain 50 and begins to deflect it, as illustrated in FIGS. 2 and 3.

As drive chain 50 is deflected, the rider's arms and drive mechanism 40 are decelerated, transferring the kinetic energy to drive chain 50. This energy, along with the high mechanical advantage available to the rider again at this point, provide a burst of power to be delivered to the drive wheel at the end of the power stroke. Additionally, the rider's strength is not wasted in decelerating the mechanism.

In the return (non-power) stroke, acceleration of motion is aided by retracting Spring 56. The only work done in the return stroke is that of compressing the legs. Compression of the legs decelerates the system at end of the return stroke, and energy is stored in the legs to be delivered in the next power stroke.

A number of methods are available for biasing drive mechanism 40 in the power stroke direction. This would utilize the return stroke motion to store more energy for the driving the vehicle, and add heavier bench-press and stomach crunch exercises to the vehicle.

Other methods of enhancing the mechanical advantage of the device include:
a) making lever arms, linkage members or footrests adjustable.
b) changing the diameter of roller 33, position of pivot 28, or position of chain connection 52 to modify the deflection of drive chain 50.
c) replace the round sprocket on overrunning clutch 54 and drive chain 50 with a grooved cam and cable similar to those used on overhead garage doors.

Operation of the vehicle embodiment utilizing a pedal crank on jackshaft 53 would be the same except the rider would have the option to stand and pedal, as on a standard upright bicycle. This would aid in starting the vehicle from a stopped position, or in climbing hills. Another option available with a pedal crank installed concerns tandem riding. If a second seat were positioned over rear wheel 62, a second tandem rider could pedal while the driver of the vehicle rows, with all power being combined to drive the vehicle. Jack shaft 53 could be positioned forward in frame 10 to better accommodate various pedal crank uses. A tandem seat could take the form of a storage rack with a cushion.

SUMMARY, RAMIFICATIONS, AND SCOPE

Accordingly, the reader will see that the human powered vehicle of this invention is a highly efficient and versatile machine. Its efficiency results from a light weight, low friction design, conservation of kinetic energy, and excellent aerodynamics. The toggle style design of the drive mechanism yields excellent impedance, matching of the arms and legs, high mechanical advantage, and an ergonomically correct motion. It is simple, yet extracts power from virtually every major muscle group of the body. It is economical to manufacture and uses standard bicycle components. It is convenient to mount, and it has comfortable, easy handling characteristics.

In addition, the basic drive mechanism can be supplemented with a bicycle style crank arm with no additional weight penalty other than the crank arms and pedals themselves.

Although the description above contains many specifics, these should not be construed as limiting the scope of the invention, but instead as merely providing exemplifications of some of the presently preferred embodiments thereof. For example, the main drive mechanism could be a separate unit from the frame. It could take many forms and configurations. It could even take the form of a stationary exercise machine for its excellent aerobic benefits. The frame could be made to fold, and stair-climber type lever arms could be used in place of the optional pedal-crank on jack shaft 53. Frame designs, steering assembly, and footrest assembly configurations are too numerous to attempt to list.

Thus, the scope of the invention should be determined by the appended claims and their legal equivalents, rather than by the examples given.

What is claimed is:
1. A human powered vehicle comprising
   a. a frame having a longitudinal axis and a seat for a rider facing parallel to said longitudinal axis,
   b. a steerable front wheel operably journaled on said frame and a rear drive wheel journaled from said frame including variable drive means for receiving power to said drive wheel
   c. a drive mechanism comprising footrests in front of said seat, mounted together on reciprocable linear motion means whereby the motion of said footrests is parallel to said longitudinal axis of said frame, and a reciprocable hand operated levering means in harmony with said linear motion means, said levering means pivoted on said frame and extending below said pivot, and having an upper end and a lower end, said lower end of said levering means pivotally connected by a rigid linkage member to said footrest linear motion means whereby a reciprocating rotational motion of said levering means defines a reciprocating linear motion of said footrests and vice-versa, said upper end of said levering means including
   d. a steering means in operative connection with said steerable front wheel via flexible sleeved cables, said steering means including thereon a handlebar, wherein rotation of said handlebar effects steering the vehicle, and drawing said handlebar effects said rotational motion of said levering means, and said linear motion of said footrests, thereby producing a power stroke, the power being transferred to said drive wheel through a
   e. drive train comprising an overrunning clutch, a jackshaft, and an elongated flexible drive means, one end of which is attached to said linear motion portion of said drive mechanism, and the other end to said frame via a biasing means, positioned to bias said drive mechanism through a return stroke, said flexible drive means traversing said overrunning clutch, said overrunning clutch operably attached to said jackshaft to effect rotation of said jackshaft in the forward direction, said jackshaft also containing thereon a sprocket, said drive wheel with said variable driving means driveably connected to said sprocket by an endless chain.

2. The vehicle of claim I further including a roller journaled at said lower end of said levering means wherein said flexible drive means is deflected from a straight course by said roller as said drive mechanism approaches the end of said power stroke, thereby decelerating said drive mechanism, and forcing higher rotational energy into said drive train to assist said power stroke.

3. The vehicle of claim 1 further including a crank arm and pedal affixed at each end of said jackshaft and oppositely disposed, thereby enabling the pedaling of said vehicle as a standard bicycle.

4. The vehicle of claim 1 whereby said frame approximates the form generally associated with standard two wheeled recumbent bicycles.

5. The vehicle of claim 1, wherein said steering means is a steering assembly, including:
   a. cable sleeve stops
   b. a drum on which the flexible steering cables are wound and affixed.

c. a handlebar, and d. a short steering column, journaled in said steering assembly on which said handlebar and said drum are mounted.

6. The vehicle of claim 1 wherein said linear motion means is a footrest assembly, guidedly supported by rollers between two square cross-sectional guide members in a parallel, side-by-side configuration.

7. The vehicle of claim 6 wherein said parallel guide members contain therein front and rear stops to restrict forward and rearward motion of said footrest assembly.

8. The vehicle of claim 1 wherein said levering means consist of two lever arms pivoted from said frame, substantially alike, and parallelly disposed between which are positioned said linear motion means and said steering means.

9. The vehicle of claim 8 wherein said steering means is rigidly mounted to said lever arms.

10. The vehicle of claim 8 further including two similar linkage members pivoted from opposite sides of said frame in conjunction with said lever arms, forming two corresponding, modified, articulated parallelograms, parallelly disposed with said steering means pivotally connected to form an upper side of the parallelograms, thereby supporting said steering means in a more operable orientation in relation to a rider, throughout said power stroke.

11. The vehicle of claim 1 wherein said elongated flexible drive means is a chain.

12. The vehicle of claim 1 wherein said biasing means is a spring.

13. The vehicle of claim 1 wherein said variable drive means is a standard bicycle derailer.

14. The vehicle of claim I wherein said steerable front wheel utilizes a standard bicycle fork assembly for steering movement about a predetermined steering axis.

15. The vehicle of claim I wherein said handlebar is a standard bicycle handlebar utilizing standard componentry contained thereon.

16. The vehicle of claim 1 wherein said seat is adjustable along said longitudinal axis of said frame.

17. The vehicle of claim 16 wherein said seat is in conjunction with a backrest, said backrest being separately adjustable from said seat.

* * * * *